(12) United States Patent
Liang et al.

(10) Patent No.: US 8,525,060 B2
(45) Date of Patent: Sep. 3, 2013

(54) INPUT DEVICE WITH SWING OPERATION

(75) Inventors: Chen-Yi Liang, New Taipei (TW); Cheng-Hsiang Chuang, New Taipei (TW); Chun-Chien Chen, New Taipei (TW); Shun-De Bai, New Taipei (TW); San-Pao Kao, New Taipei (TW)

(73) Assignee: Wistron Corporation, Xizhi Dist., New Taipei (TW)

( * ) Notice: Subject to any disclaimer, the term of this patent is extended or adjusted under 35 U.S.C. 154(b) by 195 days.

(21) Appl. No.: 13/195,861

(22) Filed: Aug. 2, 2011

(65) Prior Publication Data

US 2012/0211343 A1   Aug. 23, 2012

(30) Foreign Application Priority Data

Feb. 18, 2011   (TW) .............................. 100202997 U

(51) Int. Cl.
*H01H 1/10*   (2006.01)

(52) U.S. Cl.
USPC ......................................................... 200/512

(58) Field of Classification Search
USPC ................. 200/314, 313, 310, 308, 511, 512, 200/278, 294, 302.1, 302.2, 333, 4, 5 B, 406, 200/510, 520, 538, 548, 552, 556, 293, 296, 200/302.3, 337, 341, 343, 345
See application file for complete search history.

(56) References Cited

U.S. PATENT DOCUMENTS

| | | | | | |
|---|---|---|---|---|---|
| 4,582,967 | A | * | 4/1986 | Brumit et al. ................. | 200/5 A |
| 5,117,075 | A | * | 5/1992 | Guilleminot .................. | 200/343 |
| 5,578,802 | A | * | 11/1996 | Palmowski .................... | 200/5 A |
| 5,941,372 | A | * | 8/1999 | Johnston ....................... | 200/343 |

\* cited by examiner

*Primary Examiner* — Edwin A. Leon
*Assistant Examiner* — Anthony R. Jimenez
(74) *Attorney, Agent, or Firm* — Winston Hsu; Scott Margo

(57) ABSTRACT

An input device includes a printed circuit board for outputting a signal, a supporting base fixed on the printed circuit board, a metal dome switch installed on the printed circuit board, and a cap pivoted to the supporting base. A protrusion is formed on an end of the cap for contacting against the printed circuit board when the cap is not pressed down. The cap pivots relative to the supporting base when the cap is pressed down. An actuator is further formed on the cap and disposed on a side of the metal dome switch. The actuator of the cap presses down the metal dome switch to actuate the metal dome switch when the cap is pressed down.

7 Claims, 9 Drawing Sheets

INPUT DEVICE WITH SWING OPERATION

BACKGROUND OF THE INVENTION

1. Field of the Invention

The present invention relates to an input device, and more particularly, to an input device with swing operation for reducing total height thereof.

2. Description of the Prior Art

Generally, a conventional keyswitch of consumer electronic products utilizes a plurality of structural components with a resilient component to support a cap and rebound the cap. For example, it can utilize a scissors-type frame and a rubber dome for upright operation of the keyswitch to actuate a switch. However, upright operation needs more mechanical space for movement of the cap, so as to increase total height thereof. Besides, it has disadvantages of large amounts of components and complicated assembly. Thus, design of an input device capable of reducing occupied mechanical space and saving assembly cost is an important issue of the mechanical industry.

SUMMARY OF THE INVENTION

The present invention provides an input device with swing operation for reducing total height thereof for solving above drawbacks.

According to the claimed invention, an input device includes a printed circuit board for outputting a signal, a supporting base fixed on the printed circuit board, a metal dome switch installed on the printed circuit board, and a cap pivoted to the supporting base. A protrusion is formed on an end of the cap for contacting against the printed circuit board when the cap is not pressed down. The cap pivots relative to the supporting base when the cap is pressed down. An actuator is further formed on the cap and disposed on a side of the metal dome switch. The actuator of the cap presses down the metal dome switch to actuate the metal dome switch when the cap is pressed down.

According to the claimed invention, at least one opening is formed on the printed circuit board and located in a position corresponding to a pivot of the cap and the supporting base.

According to the claimed invention, the supporting base is fixed on the printed circuit board in a hot melt manner.

According to the claimed invention, a notch is formed on the supporting base and located in a position corresponding to the metal dome switch.

According to the claimed invention, the printed circuit board contacts against the other end of the cap when the cap is pressed down.

According to the claimed invention, the input device further includes a flexible flat cable connected to the printed circuit board for transmitting the signal from the printed circuit board.

According to the claimed invention, the actuator is a boss.

According to the claimed invention, the input device is a keyswitch.

The input device of the present invention performs swing operation of the cap, instead of upright operation of conventional caps. The protrusion of the cap contacts against the printed circuit board when the cap is not pressed down, so as to keep the cap at a certain height. It can reduce the moving height of the cap so that there is no need to reserve more space for movement of the cap to save an internal mechanical space. Furthermore, the input device utilizes fewer components and has easy assembly, for reducing manufacturing and assembly cost.

These and other objectives of the present invention will no doubt become obvious to those of ordinary skill in the art after reading the following detailed description of the embodiment that is illustrated in the various figures and drawings.

DETAILED DESCRIPTION

Figure 1:
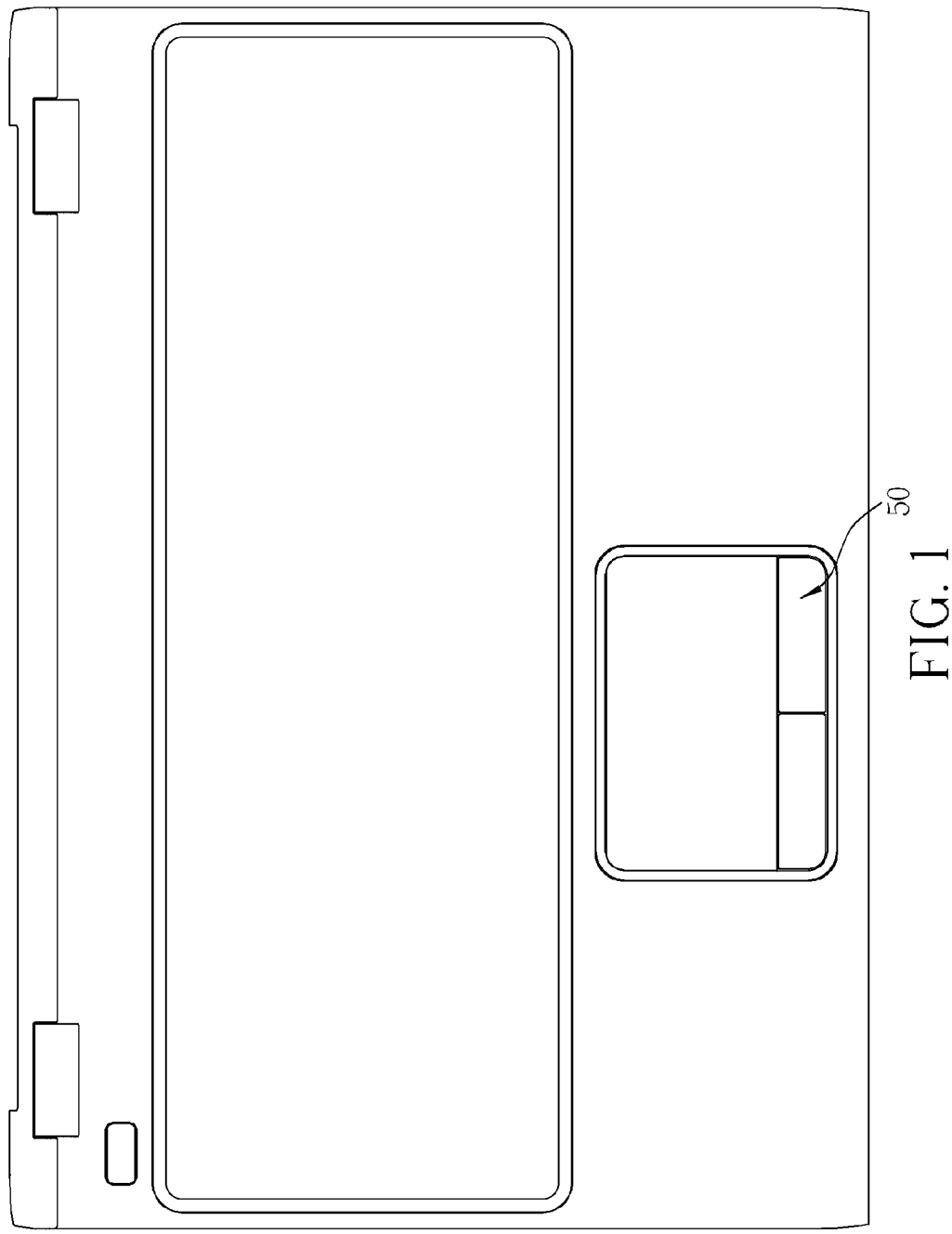
FIG. 1 is a schematic drawing of an input device according to an embodiment of the present invention.
Figure 2:
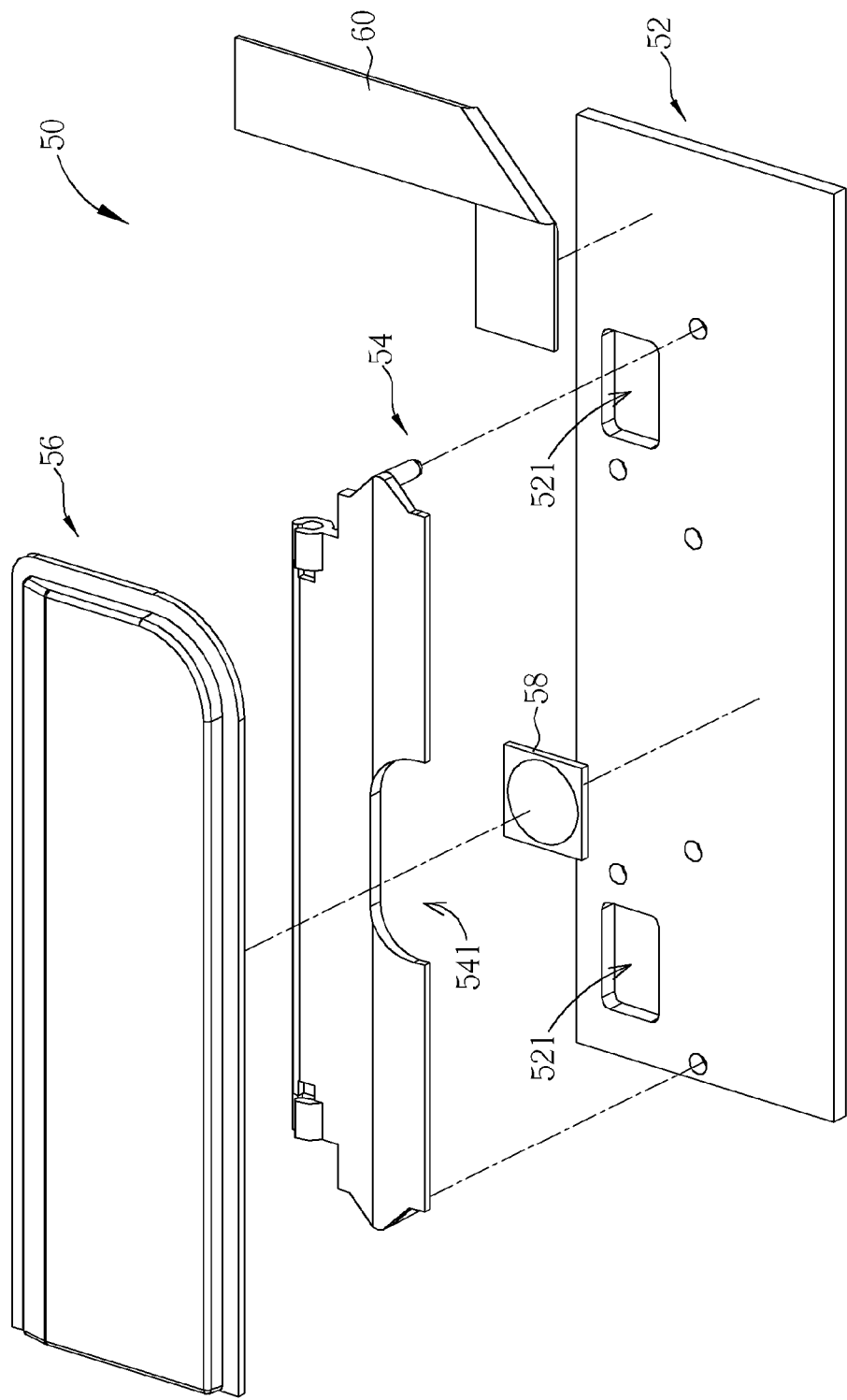
FIG. 2 and FIG. 3 are exploded diagrams of the input device in different views according to the embodiment of the present invention.
Figure 3:
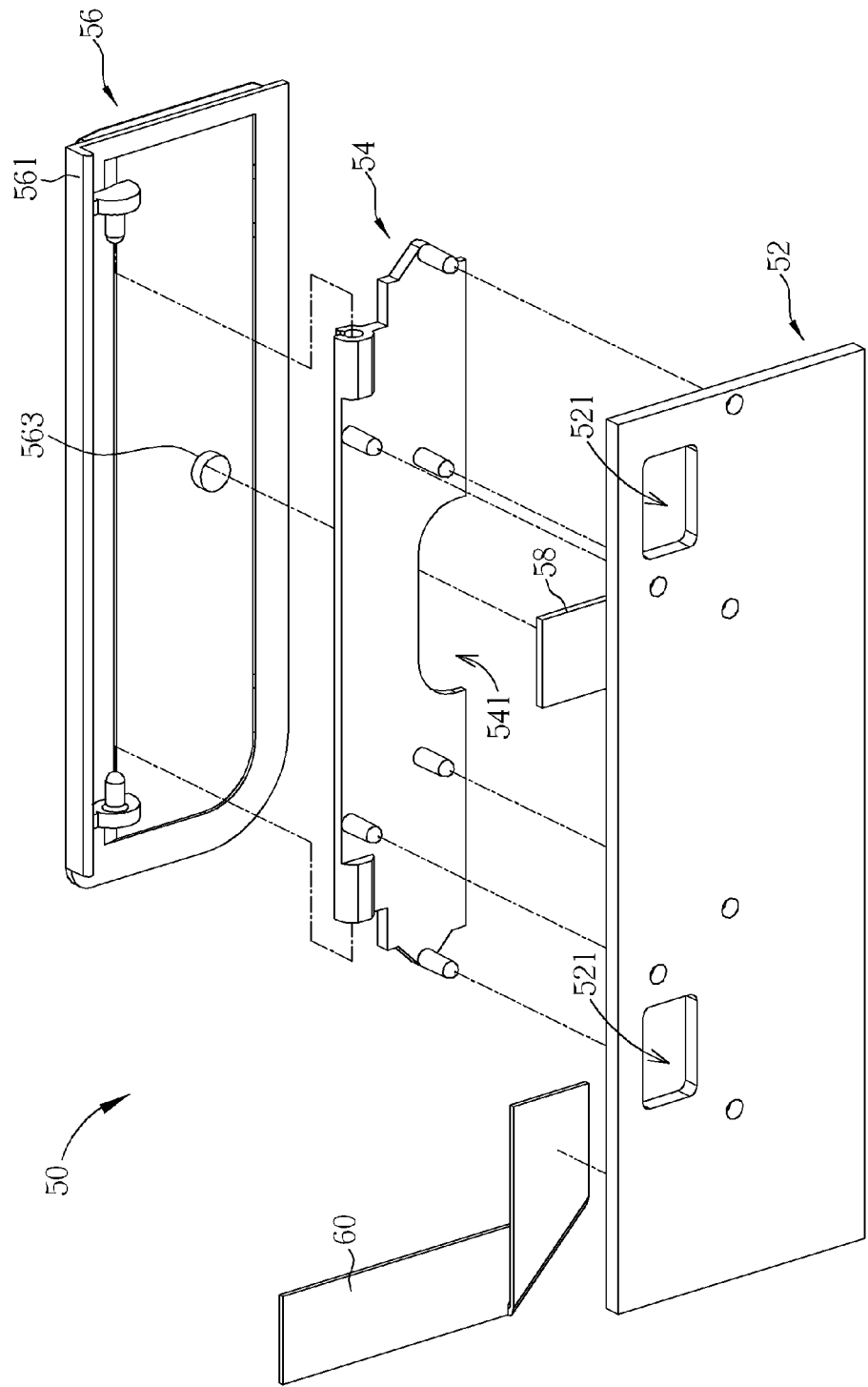

Please refer to FIG. 1 to FIG. 3. FIG. 1 is a schematic drawing of an input device 50 according to an embodiment of the present invention. FIG. 2 and FIG. 3 are exploded diagrams of the input device 50 in different views according to the embodiment of the present invention. The input device 50 can be a keyswitch, such as a keyswitch disposed below a touchpad of a notebook. The input device 50 includes a print circuit board 52 for outputting a signal. At least one opening 521 is formed on the print circuit board 52. The input device 50 further includes a supporting base 54 fixed on the printed circuit board 52. For example, the supporting base 54 can be fixed on the printed circuit board 52 in a hot-melt manner. A notch 541 is formed on the supporting base 54. The input device 50 further includes a cap 56 pivoted to the supporting base 54, such as combination of a positioning rod sheathed with a sheath. The supporting base 54 can constrain planar movement of the cap 56, so that the cap 56 can rotate precisely. The cap 56 can be an appearance structure of the input device 50, and a user can press the cap 56 to generate corresponding signals. A protrusion 561 is formed on an end of the cap 56, and the protrusion 561 can be a rib. The protrusion 561 contacts against the printed circuit board 52 when the cap 56 is not pressed down, and the protrusion 561 pivots relative to the supporting base 54 when the cap 56 is pressed down. An actuator 563 is further formed on the cap 56, and the actuator 563 can be a boss.

Figure 4:
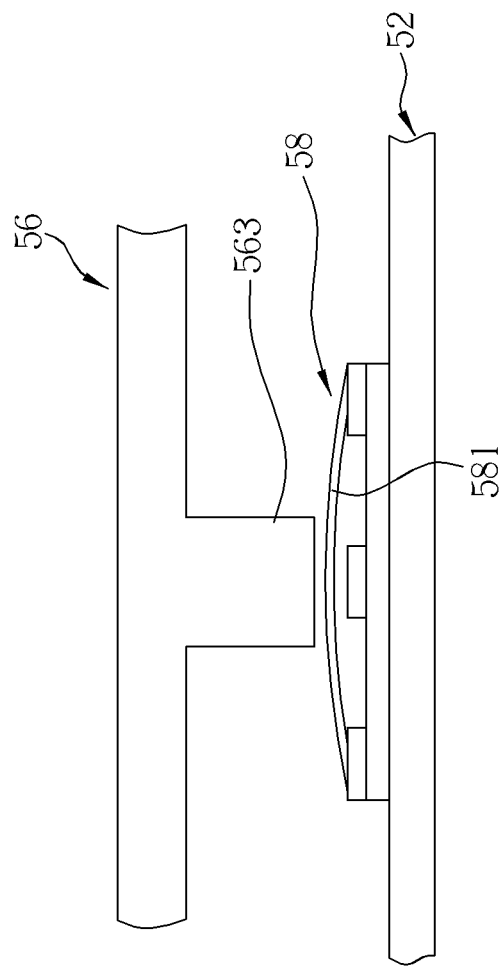
FIG. 4 and FIG. 5 are diagrams respectively showing that a cap presses and does not press a metal dome switch according to the embodiment of the present invention.
Figure 5:
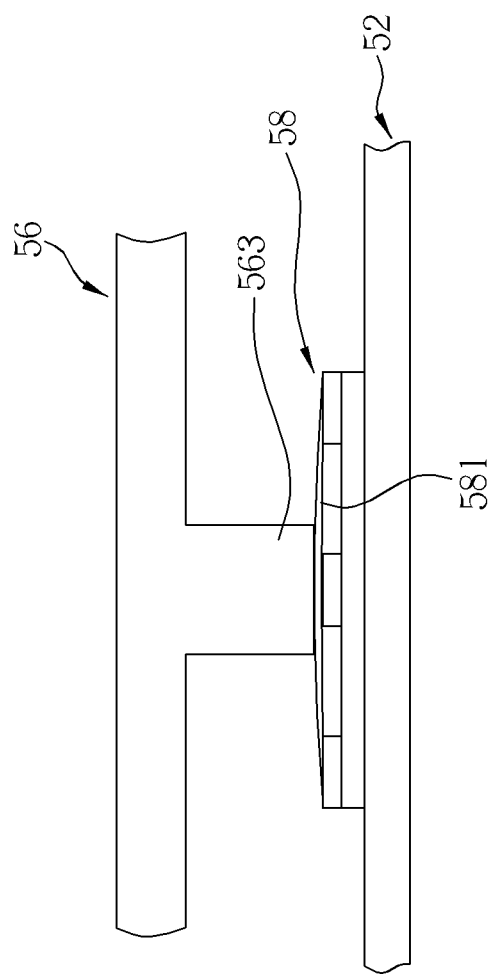

The input device 50 further includes a metal dome switch 58 installed on the printed circuit board 52 and disposed on a side of the actuator 563 of the cap 56. The metal dome switch 58 is located in a position corresponding to the notch 541 of the supporting base 54, so as to prevent interference with the supporting base 54. The actuator 563 of the cap 56 can press down the metal dome switch 58 to actuate the metal dome switch 58 for outputting corresponding signals to the printed circuit board 52 when the cap 56 is pressed down. Please refer to FIG. 4 and FIG. 5. FIG. 4 and FIG. 5 are diagrams respectively showing that the cap 56 presses and does not press the metal dome switch 58 according to the embodiment of the present invention. The actuator 563 of the cap 56 presses a metal dome 581 of the metal dome switch 58 to deform the metal dome 581 from its original situation as shown in FIG. 4 to its deformed situation as shown in FIG. 5, so as to conduct circuits on lateral parts and a central part of the metal dome switch 58 for generating corresponding switch signals, as the cap 56 is pressed down by the user. The metal dome 581 of the metal dome switch 58 can resiliently support the cap 56 and provide an operational feeling. The actuator 563 of the cap 56 separates from the metal dome switch 58 as the cap 56 is released, so that the metal dome switch 58 resiliently recovers from its deformed situation as shown in FIG. 5 to its original situation as shown in FIG. 4 and provides a resilient force to the cap 56 for recovering the cap 56 back to an unpressed position. In addition, the input device 50 further includes a flexible flat cable 60 connected to the printed circuit board 52 for transmitting the signal from the printed circuit board 52, such as a switch signal, to other circuit. It can save cost by using the printed circuit board 52 and the flexible flat cable 60 to transmit signals to other circuit.

Figure 6:
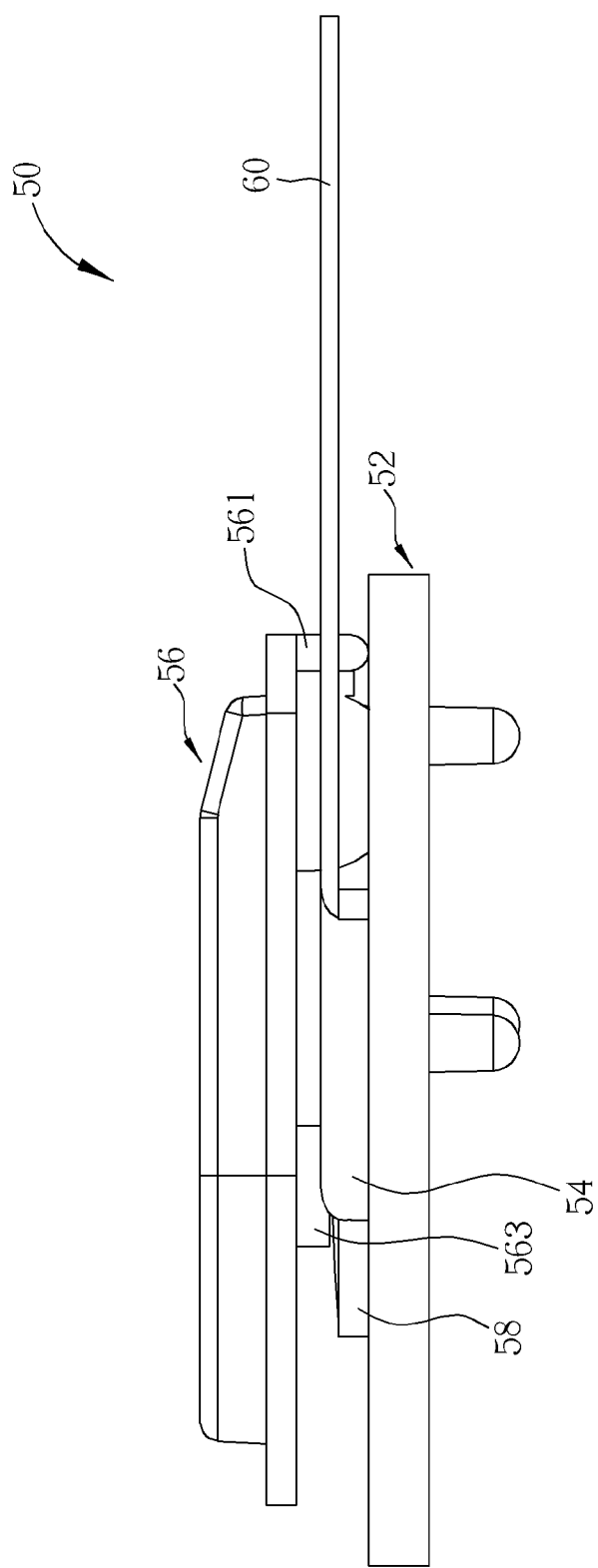
FIG. 6 and FIG. 7 are lateral diagrams respectively showing the cap being unpressed and pressed according to the embodiment of the present invention.
Figure 7:
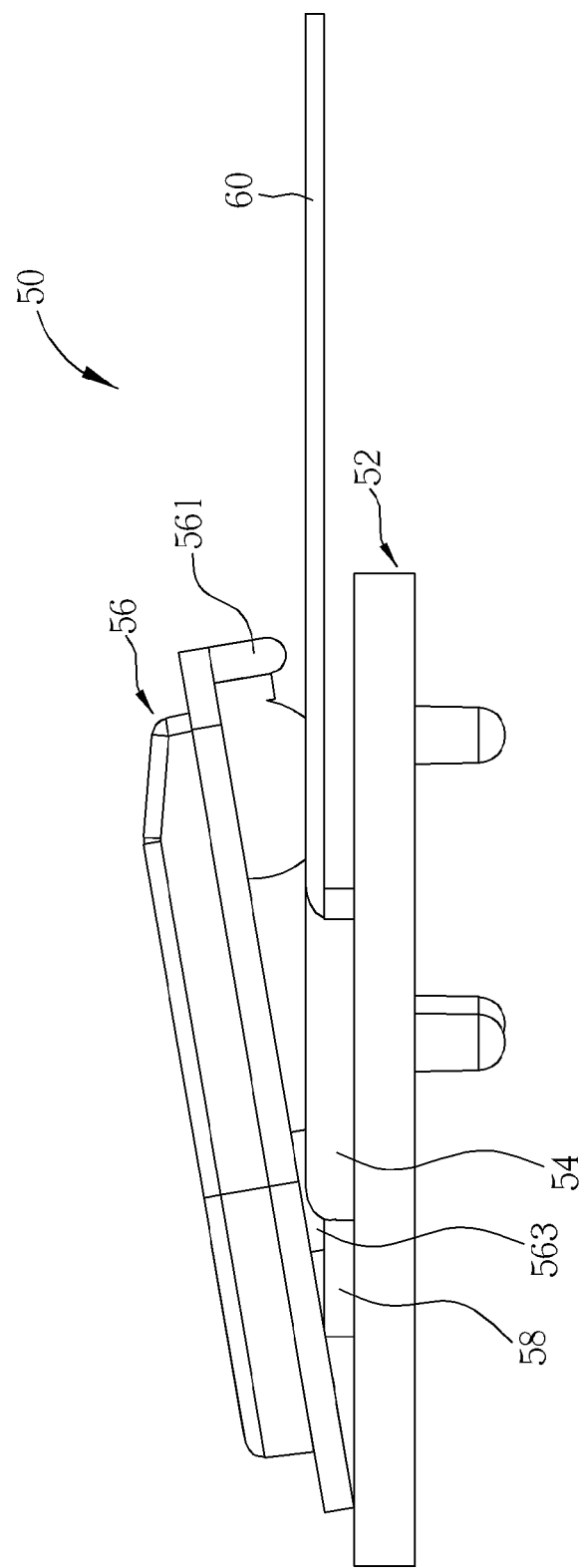
Figure 8:
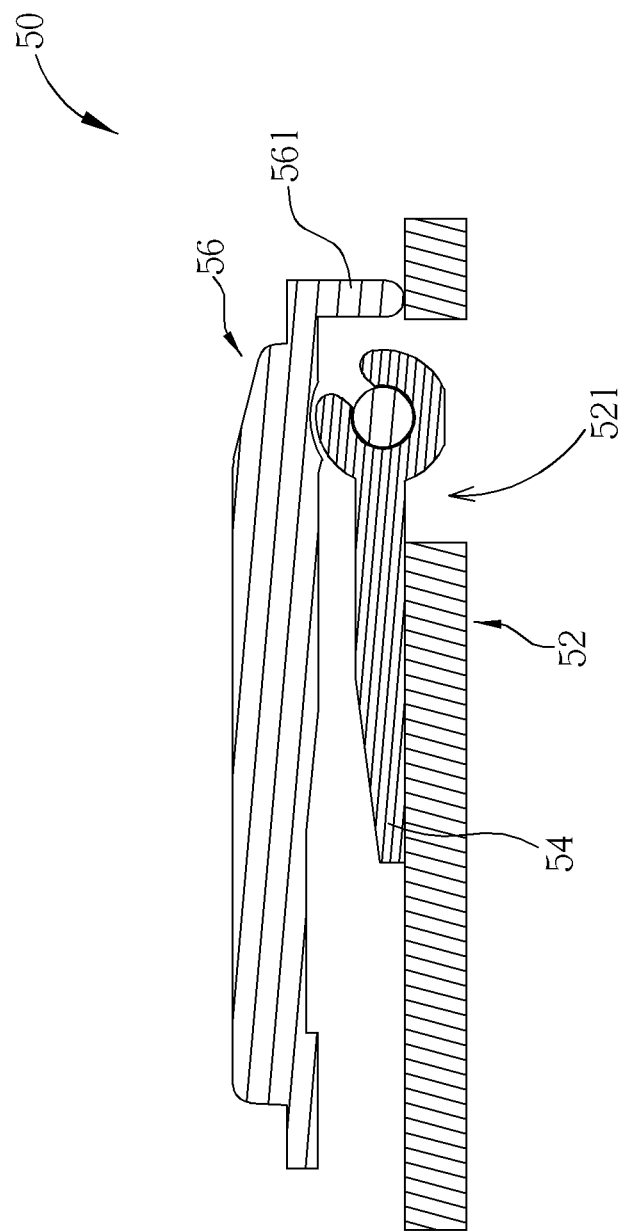
FIG. 8 and FIG. 9 are sectional diagrams respectively showing the cap being unpressed and pressed according to the embodiment of the present invention.
Figure 9:
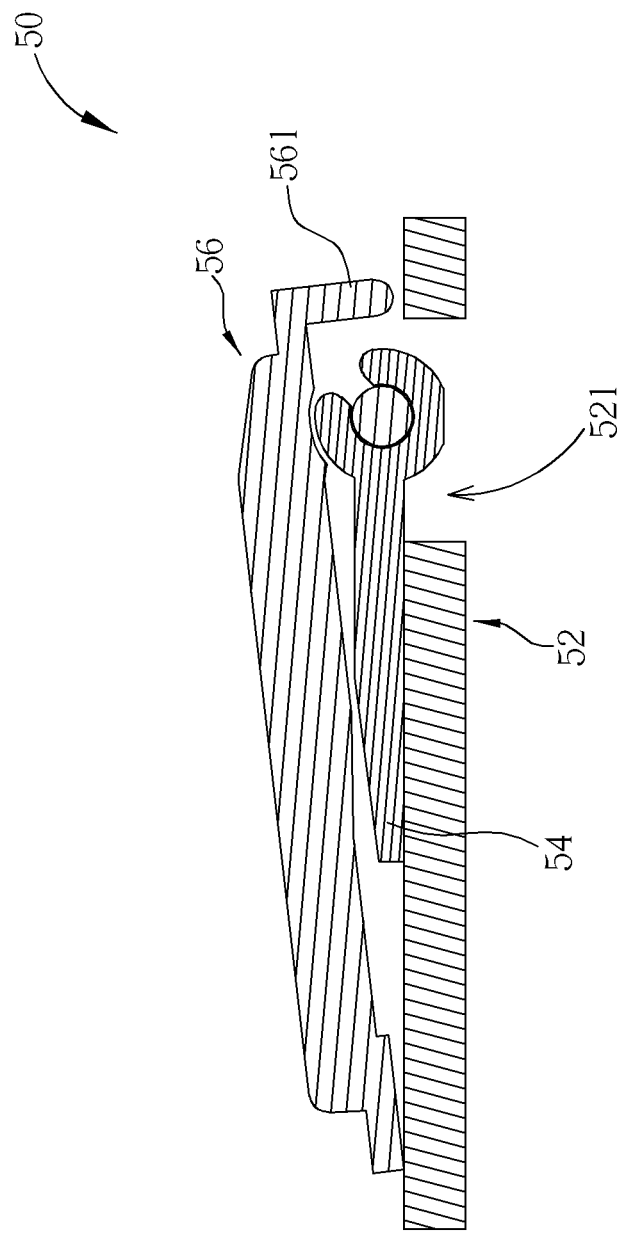

Please refer to FIG. 1 to FIG. 9. FIG. 6 and FIG. 7 are lateral diagrams respectively showing the cap 56 being unpressed and pressed according to the embodiment of the present invention. FIG. 8 and FIG. 9 are sectional diagrams respectively showing the cap 56 being unpressed and pressed according to the embodiment of the present invention. The protrusion 561 of the cap 56 contacts against the printed circuit board 52 when the cap 56 is not pressed down by the user, so that the cap 56 and the printed circuit board 52 are substantially parallel to each other and the cap 56 can be kept at a certain height. The cap 56 pivots relative to the supporting base 54 when the cap 56 is pressed down by the user, until the printed circuit board 52 contacts against the other end of the cap 56. In summary, the present invention provides swing operation of the cap 56, instead of upright operation of conventional caps. Because the openings 521 of the printed circuit board 52 are respectively located in positions corresponding to pivots of the cap 56 and the supporting base 54, the cap 56 can pivot relative to the supporting base 54 without interference with the printed circuit board 52.

Comparing to the prior art, the input device of the present invention performs swing operation of the cap, instead of upright operation of conventional caps. The protrusion of the cap contacts against the printed circuit board when the cap is not pressed down, so as to keep the cap at a certain height. It can reduce the moving height of the cap so that there is no need to reserve more space for movement of the cap to save an internal mechanical space. Furthermore, the input device utilizes fewer components and has easy assembly, for reducing manufacturing and assembly cost.

Those skilled in the art will readily observe that numerous modifications and alterations of the device and method may be made while retaining the teachings of the invention.

What is claimed is:

1. An input device comprising:
   a print circuit board for outputting a signal;
   a supporting base fixed on the printed circuit board;
   a metal dome switch installed on the printed circuit board; and
   a cap pivoted to the supporting base, a protrusion being formed on an end of the cap for contacting against the printed circuit board when the cap is not pressed down and for separating from the printed circuit board when the cap is pressed down, the cap pivoting relative to the supporting base so that the printed circuit board contacts against the other end of the cap when the cap is pressed down, an actuator being further formed on the cap and disposed on a side of the metal dome switch, and the actuator pressing down the metal dome switch to actuate the metal dome switch when the cap is pressed down.

2. The input device of claim 1, wherein at least one opening is formed on the printed circuit board and located in a position corresponding to a pivot of the cap and the supporting base.

3. The input device of claim 1, wherein the supporting base is fixed on the printed circuit board in a hot melt manner.

4. The input device of claim 1, wherein a notch is formed on the supporting base and located in a position corresponding to the metal dome switch.

5. The input device of claim 1, further comprising a flexible flat cable connected to the printed circuit board for transmitting the signal from the printed circuit board.

6. The input device of claim 1, wherein the actuator is a rod structure.

7. The input device of claim 1, being a keyswitch.

* * * * *